O. F. MORRILL.
Broiling Apparatus.
No. 26,368.
Patented Dec. 6, 1859.
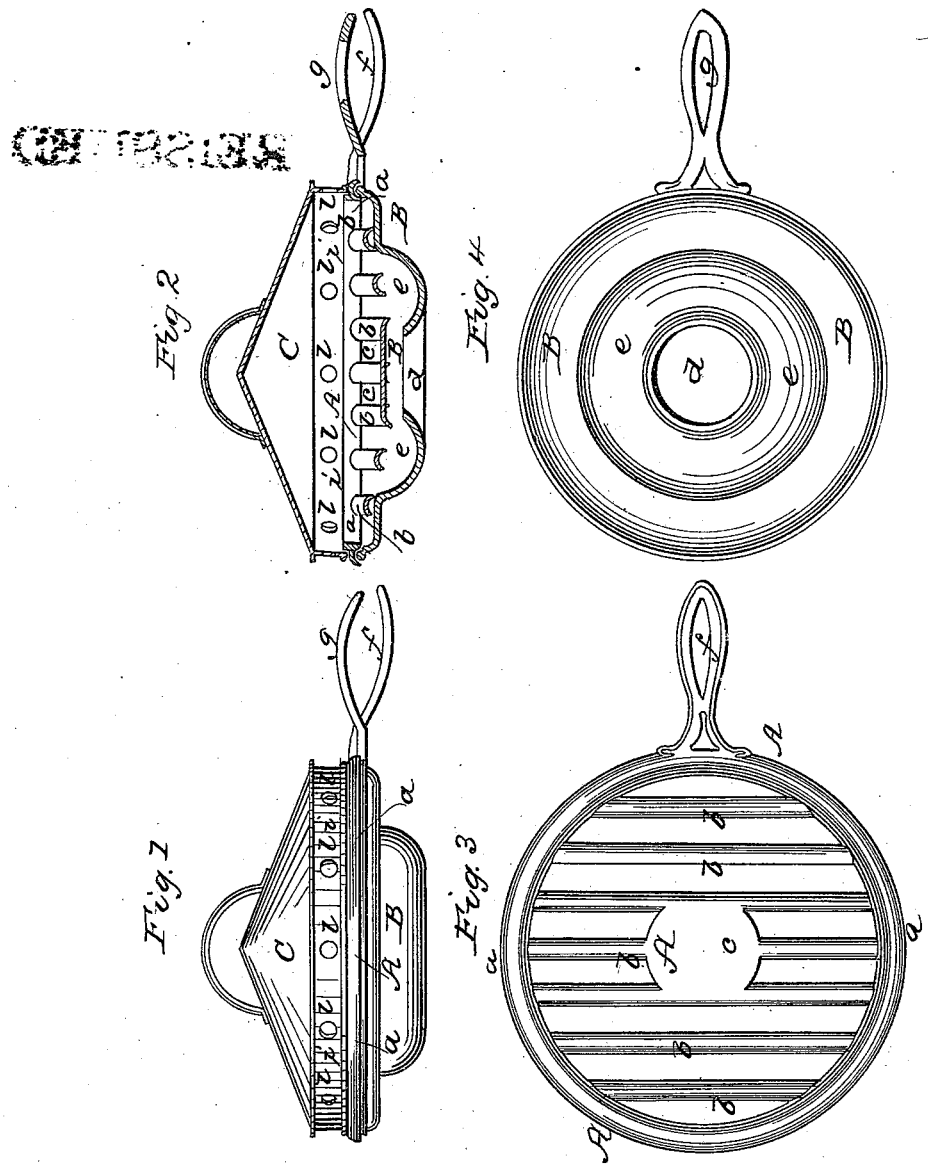
WITNESSES
INVENTOR

UNITED STATES PATENT OFFICE.

OSCAR F. MORRILL, OF BOSTON, MASSACHUSETTS.

BROILING APPARATUS.

Specification forming part of Letters Patent No. 26,368, dated December 6, 1859; Reissued November 10, 1863, No. 1,568.

*To all whom it may concern:*

Be it known that I, OSCAR F. MORRILL, of Boston, in the county of Suffolk and State of Massachusetts, have invented an Improved Broiling Apparatus for Either a Hydrocarbon Aero-Vapor or Aero-Gas Burner; and I do hereby declare that the same is fully described and represented in the following specification and the accompanying drawings, of which—

Figure 1, is a side elevation, and Fig. 2, a transverse section of the same; Fig. 3, a top view of its grating, and Fig. 4, a top view of the gravy pan.

The said broiling apparatus is composed of two principal parts A, B, furnished with a cover C, each being circular in shape horizontally. The part A, is made somewhat like a common gridiron, or is composed of an annulus $a$, and a series of bars, $b, b, b$, arranged parallel to one another and across the annulus as shown in the drawings, each of the said bars, as well as the said annulus being concave on the under and convex on the upper side. Furthermore, there is placed, at the central part of the gridiron, a deflector or plate, $c$, the same being formed and arranged as represented in the drawings. Underneath, the said gridiron or part A, is the drip or gravy pan B, which is constructed somewhat in the shape of a common soup plate except that its bottom is formed with a heat passage $d$, through it and is curved upward about the said heat passage so as to form a trough or gravy receptacle, $e$, circumscribing the heat passage. To each part, A, B, a handle, $f$, or, $g$, should be applied and so as to extend therefrom as seen in the drawings. A planished tin cover, C, rests upon the gridiron A, and is constructed with its lower part, $i$, in the form of an annulus pierced with holes or discharging orifices, $l, l, l$, the upper part of the cover being either conical or meniscus shape, such part having a handle arranged upon it as shown in Fig. 1.

The culinary or broiling apparatus above described is intended to be used on a gas stove, or over an aerovapor burner, in which case, the volatile products of combustion from the burner may be supposed to pass through the orifice at the middle of the gravy pan or part, B, and to impinge against the deflector at the middle of the gridiron or part, A, such deflector serving to spread the current of heat in radial directions underneath the bars of the grid or grate so as to thoroughly and equally cook the under surface of a piece of meat when placed on the said bars. Owing to the peculiar construction of the cover and the arrangement of its heat discharging orifices the currents of heat, that may ascend through the grate bars into the cover, will be deflected by it upon the top surface of the meat and will be finally discharged out of the holes at the lower part or rim of the cover.

The said apparatus operates very advantageously for the purpose for which it is intended.

I claim—

The improved steak broiler as made with the deflector on its grid or grating, a flame and heat passage under the deflector, and with the gravy trough to surround or encompass the heat passage as specified.

OSCAR F. MORRILL.

Witnesses:
 R. H. EDDY,
 F. P. HALE, Jr.